US006328010B1

(12) United States Patent
Thurman

(10) Patent No.: US 6,328,010 B1
(45) Date of Patent: Dec. 11, 2001

(54) SPARK PLUG WIRE HARNESS ASSEMBLY

(76) Inventor: Mark A. Thurman, 7851 N. 49th Ave., Glendale, AZ (US) 85301

( * ) Notice: Subject to any disclaimer, the term of this patent is extended or adjusted under 35 U.S.C. 154(b) by 0 days.

(21) Appl. No.: 09/635,831

(22) Filed: Aug. 9, 2000

(51) Int. Cl.[7] .............................. F02P 15/00; H02G 3/04
(52) U.S. Cl. ..................................... 123/143 C; 174/72 A
(58) Field of Search ............................ 123/143 C, 169 P, 123/169 PA, 169 PH; 174/72 A

(56) References Cited

U.S. PATENT DOCUMENTS

| | | | | |
|---|---|---|---|---|
| 2,488,096 | * | 11/1949 | Newman | 123/143 C |
| 3,104,658 | * | 9/1963 | Olsen | 123/143 C |
| 3,339,010 | * | 8/1967 | Brentrup | 123/169 PA X |
| 4,756,283 | * | 7/1988 | Kleinbohl | 123/143 C |
| 5,046,466 | * | 9/1991 | Lipski | 123/169 MG X |

* cited by examiner

*Primary Examiner*—Tony M. Argenbright
(74) *Attorney, Agent, or Firm*—Charlene R. Jacobsen; Lowell W. Gresham; Meschkow & Gresham, P.L.C.

(57) ABSTRACT

A spark plug wire harness (20) for use with an ignition system (50) of an internal combustion engine (52) includes a substantially rigid body (22), plug wire mounting posts (24) coupled to an input end (30) of the rigid body (22), and terminals (26) coupled to an output end (32) of the rigid body (22). Conductors (34) are embedded in the substantially rigid body (22). Each of the conductors (34) has a first end (36) in electrical communication with one of the plug wire mounting posts (24) and a second end (38) in electrical communication with one of the terminals (26). The spark plug wire harness (20) to conveys igniting voltage received at the posts (24) from spark plug wires (56) to the terminals (26). The terminals (26) are in electrical contact with spark plugs (44) of the ignition system (50) so that the spark plugs (44) fire in sequence.

20 Claims, 3 Drawing Sheets

SPARK PLUG WIRE HARNESS ASSEMBLY

TECHNICAL FIELD OF THE INVENTION

The present invention relates to the field of internal combustion engines. More specifically, the present invention relates to ignition systems of internal combustion engines.

BACKGROUND OF THE INVENTION

An internal-combustion engine obtains its power from heat and pressure produced by the combustion of a fuel-air mixture inside a closed chamber or cylinder. A spark ignition internal combustion engine, i.e., a typical gasoline engine, uses a spark to ignite the fuel-air mixture. An ignition system of a spark ignition internal combustion engine typically includes a battery, a distributor, an ignition switch, primary and secondary wiring, spark plug wires, and spark plugs. The distributor distributes an igniting voltage to the spark plugs via the spark plug wires so that they fire in a definite sequence. The spark plugs are threaded into the cylinders of a multi-cylinder internal-combustion engine to ignite the fuel-air mixture by producing timed sparks between electrodes in response to the received igniting voltage.

The spark plug wires are typically routed around or over the exhaust manifold, or header, of the internal combustion engine. A wire loom or spark plug wire retaining clips may be used to route and retain the spark plug wires. In addition, heat shields may be used to insulate the spark plug wires from the heat produced by the internal combustion engine. In a typical gasoline powered internal-combustion engine, such as in a car, van, or truck, the spark plug wires are often subject to premature failure caused by heat fatigue from the heat produced at the exhaust manifold. The problem of heat fatigue may be exacerbated if the spark plug wires become disengaged from the wire loom and come into contact with the engine. Alternatively, or in addition to heat fatigue, if the spark plug wires are incorrectly routed or become disengaged from the wire loom or retaining clips, the spark plug wires could be cut or chafed, further leading to spark plug wire failure.

Unfortunately, failure of the spark plug wires delays or prevents the igniting voltage from reaching the spark plugs, necessitating the replacement of the failed spark plug wires. Consequently, failure of the spark plug wires leads to engine malfunction, inconvenience to the owner of vehicle, and undesirable repair costs.

The replacement of failed spark plug wires can present additional problems. In particular, spark plug wire routings must be kept intact during service and followed exactly when replacement of the wires becomes necessary. Failure to route the wires properly can lead to radio ignition noise and crossfiring of the spark plugs, or shorting of the spark plug leads to ground.

Another problem arise when installing the spark plug wire boots onto the spark plugs because it may be difficult to assure that the metal terminal within the boot is fully seated on the spark plug terminal and that the boot has not moved on the wire. If boot to wire movement has occurred, the boot may give a false impression of being fully seated, although good electrical contact has not been made between the spark plug wire and the spark plug. The aforementioned conditions result in the further need for troubleshooting to identify the installation problem, increases repair time, and increases repair costs.

SUMMARY OF THE INVENTION

Accordingly, it is an advantage of the present invention that a spark plug wire harness for use with an ignition system of an internal combustion engine is provided.

It is another advantage of the present invention that a spark plug wire harness is provided that insulates the spark plug wires from the heat produced by the internal combustion engine.

It is yet another advantage of the present invention that the spark plug wire harness is readily removed and reinstalled with spark plug wire routings intact.

The above and other advantages of the present invention are carried out in one form by a spark plug wire harness for use with an ignition system of an internal combustion engine. The spark plug wire harness includes a substantially rigid body, plug wire mounting posts coupled to an input end of the substantially rigid body, and terminals coupled to an output end of the substantially rigid body. Conductors are embedded in the substantially rigid body. Each of the conductors has a first end in electrical communication with one of the plug wire mounting posts and a second end in electrical communication with one of the terminals.

The above and other advantages of the present invention are carried out in another form by an assembly for providing voltage from a distributor to spark plugs in an ignition system of an internal combustion engine. The assembly includes a distributor cap configured to couple with the distributor in the ignition system, the distributor cap including conductive posts, and spark plug wires. Each of the spark plug wires has a proximal end and a distal end, the proximal end being coupled to one of the conductive posts. The assembly further includes a spark plug wire harness. The spark plug wire harness includes a substantially rigid body. Plug wire mounting posts are coupled to an input end of the substantially rigid body, the distal end of each spark plug wire being coupled to one of the plug wire mounting posts. Terminals are coupled to an output end of the substantially rigid body, the terminals being configured to be placed in electrical communication with the spark plugs. Conductors are embedded in the substantially rigid body. The conductors have first ends in electrical communication with the plug wire mounting posts and second ends in electrical communication with the terminals.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
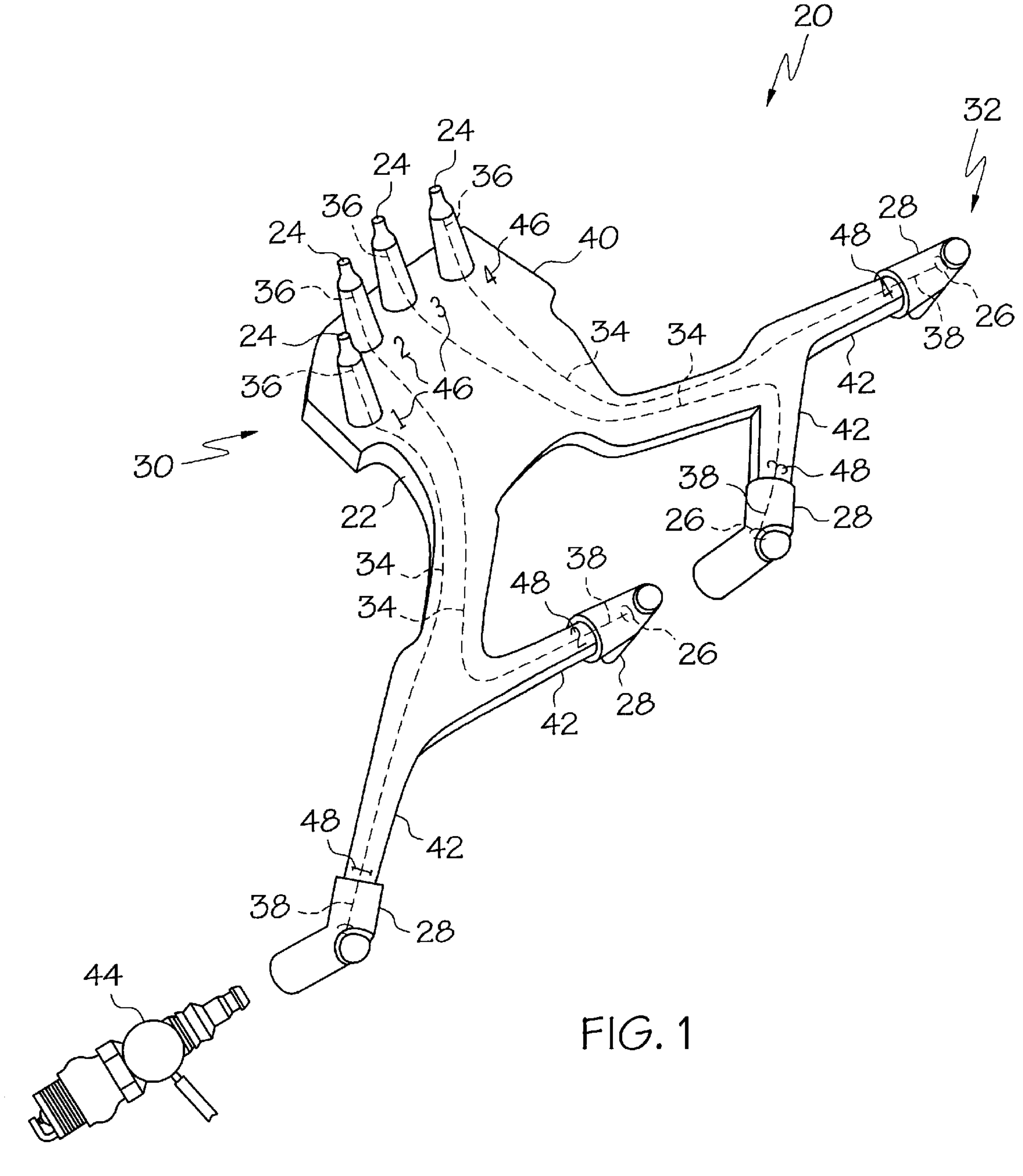
FIG. 1 shows a perspective view of a spark plug wire harness in accordance with a preferred embodiment of the present invention.

FIG. 1 shows a perspective view of a spark plug wire harness 20 in accordance with a preferred embodiment of the present invention. Harness 20 is configured for use with an ignition system of an internal combustion engine, as discussed below.

Harness 20 includes a substantially rigid body 22, plug wire mounting posts 24, and terminals 26 (shown in ghost form). Each of terminals 26 is surrounded by a boot 28. Plug wire mounting posts 24 are coupled to an input end 30 of substantially rigid body 22 and terminals 26 are coupled to an output end 32 of body 22.

Conductors 34 (shown in ghost form) are embedded in substantially rigid body 22. Each of conductors 34 has a first end 36 in electrical communication with one of plug wire mounting posts 24 and a second end 38 in electrical communication with one of terminals 26. Conductors 34 are desirably manufactured from a standard radio suppression core, carbon impregnated cord conductor, or some conductor type known to those skilled in the art.

Substantially rigid body 22 insulates conductors 34 from heat. In addition, rigid body 22 maintains each of conductors 34 in electrical isolation from one another. In a preferred embodiment, rigid body 22 is formed from a heat resistant plastic. Alternatively, rigid body 22 may be formed from a heat resistant carbon fiber. Rigid body 22 may be manufactured using an injection molding technique in which plug wire mounting posts 24, terminals 26, and conductors 34 are embedded into the malleable material as rigid body 22 is molded.

In an alternative manufacturing technique, rigid body 22 may be machined from heat resistant plastic or carbon fiber. Following manufacture of rigid body 22, channels (not shown) are cut into rigid body 22. One each of conductors 34 is then placed into one each of the channels. Conductors 34, mounting posts 24, and terminals 26 are subsequently affixed to rigid body 22 using an epoxy resin or some other heat resistant adhesive.

Input end 30 of rigid body 22 is formed as a trunk 40, each of plug wire mounting posts 24 being coupled to trunk 40. In other words, trunk 40 forms a common site on rigid body 22 for the positioning of plug wire mounting posts 24. Trunk 40 separates to form branches 42 at output end 32 of rigid body 22. Thus, conductors 34 are routed from trunk 40 through corresponding ones of branches 42.

Branches 42 are in spaced-apart relation relative to one another. This spaced-apart relation corresponds to the spacing between spark plugs 44, of which only one is shown, threaded into the cylinders of a multi-cylinder internal-combustion engine (discussed below).

First unique identifiers 46 are located on substantially rigid body 22 proximate plug wire mounting posts 24, that is, on trunk 40. One each of first unique identifiers 46 identifies one each of plug wire mounting posts 24. Likewise, second unique identifiers 48 are located on substantially rigid body 22 proximate terminals 38, that is, on each of branches 42. One each of second unique identifiers 48 identifies one each of terminals 38. First unique identifiers 46 correspond to second unique identifiers 48. For example, first and second unique identifiers 46 and 48, respectively, correspond to a conventional spark plug sequential numbering system (i.e., 1, 2, 3, and 4).

Figure 2:
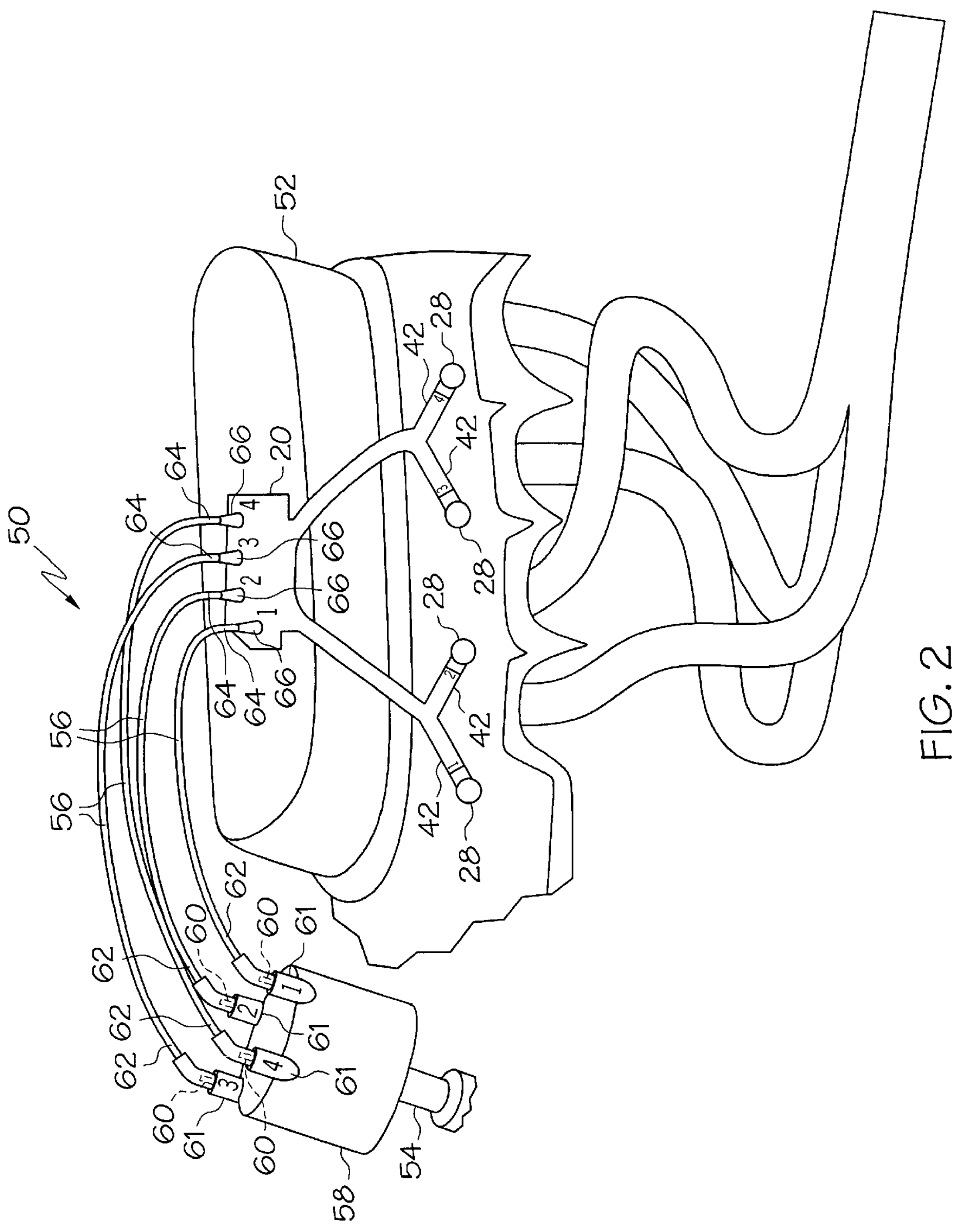
FIG. 2 shows a perspective view of a spark plug wire harness in use with an ignition system of an internal-combustion engine.

FIG. 2 shows a perspective view of spark plug wire harness 20 in use with an ignition system 50 of an internal-combustion engine 52. As discussed previously, an ignition system, such as ignition system 50, generally includes a battery, a distributor 54, an ignition switch, primary and secondary wiring, spark plug wires 56, and spark plugs 44 (FIG. 1). The battery, ignition switch, and primary and secondary wiring are not shown for clarity of illustration.

A distributor cap 58 couples with distributor 54 of ignition system 50 of engine 52. Distributor cap 58 includes conductive posts 60. Distributor 54 provides an igniting voltage to conductive posts 60 of distributor cap 58 in a definite sequence. The quantity of conductive posts 60 relates to the quantity of cylinders, therefore the number of spark plugs 44 (FIG. 1), present in engine 52. For clarity of illustration, distributor cap 58 includes four of conductive posts 60, indicating that engine 52 is a four-cylinder engine. However, it should be apparent to those skilled in the art that engine 52 may have six, eight, or some other quantity of cylinders. As such, harness 20 can be adapted to accommodate the particular quantity of cylinders, hence the quantity of spark plugs 44 (FIG. 1), for the particular engine. Alternatively, more than one harness 20 may be employed to accommodate a large number of cylinders. For example, two harnesses 20 may be used with an eight-cylinder engine.

Distributor cap 58 may also include unique identifiers 61 that correspond to first and second unique identifiers 46 and 48, respectively, on harness 20. That is, unique identifiers 61 correspond to the conventional spark plug sequential numbering system (i.e., 1, 2, 3, and 4).

Each of spark plug wires 56 has a proximal end 62 and a distal end 64. Proximal end 62 is coupled to one of conductive posts 60 of distributor cap 58. Distal end 64 includes a spark plug boot 66. One each of plug wire mounting posts 24 is configured to fit in one each of spark plug boots 66 in order to establish electrical contact between one of plug wire mounting posts 24 and one of spark plug wires 56. In addition, each of spark plug wires 56 is connected to conductive posts 60 and plug wire mounting posts 24 in accordance with unique identifiers 61 and first unique identifiers 46. By way of example, when proximal end 62 is coupled to conductive post 60 labeled with unique identifier 61 of "1", then distal end 64 is coupled to plug wire mounting post 24 labeled with first identifier 46 of "1".

Boots 28 of harness 20 are seated over one each of spark plugs 44 (FIG. 1) which are threaded into the cylinders (not shown) of engine 52. Each of boots 28 is configured to be seated over one of spark plugs 44 in order to establish electrical contact between one of terminals 26 (FIG. 1), surrounded by one of boots 28, and one of spark plugs 44.

Accordingly, distributor 54 distributes an igniting voltage to conductive posts 60 of distributor cap 58. The igniting voltage is delivered to spark plugs 44 (FIG. 1) via spark plug wires 56 and conductors 34 of harness 22 so that spark plugs 44 fire in a definite sequence, i.e., 1, 2, 3, and 4.

Figure 3:
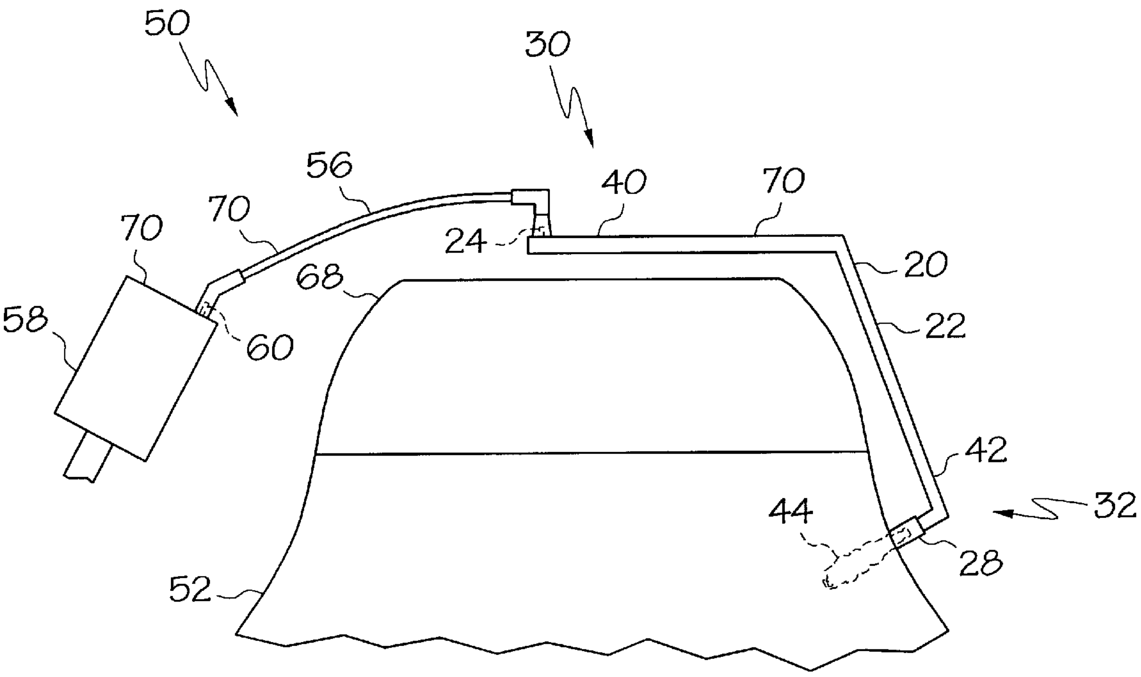
FIG. 3 shows a partial side view of the spark plug wire harness in use with the ignition system of the internal-combustion engine.

FIG. 3 shows a partial side view of spark plug wire harness 20 in use with ignition system 50 of internal-combustion engine 52. FIG. 3 illustrates only one of spark plug wires 56 coupled between one of conductive posts 60 on distributor cap 58 and one of plug wire mounting posts 24 at input end 30 of substantially rigid body 22 for simplicity of illustration. In addition, FIG. 3 illustrates only one of boots 28 at output end 32 of rigid body 22 seated over one of spark plugs 44 (shown in ghost form), for simplicity of illustration.

As exemplified in FIG. 3, substantially rigid body 22 is adapted to avoid contact with internal combustion engine 52. That is, body 22 contours to the side of engine 52 without touching engine 52. The heat insulting properties of rigid body 22 and this avoidance of contact with engine 52 substantially prevents the problem of heat fatigue of conductors 34 (FIG. 1) in spark plug wire harness 22.

Furthermore, trunk 40 of harness 20 is located above a valve cover 68 of engine 52. Thus, trunk 40 of harness 20 is closer to distributor cap 58 than spark plugs 44 are to distributor cap 58. Spark plug wire harness 20 allows the use of shorter spark plug wires 56, than in prior art ignition systems in which the spark plug wires are routed from a distributor cap to the spark plugs. The use of shorter spark plug wires 56 advantageously decreases the probability of premature failure of spark plug wires 56 due to heat fatigue. The probability of premature failure is decreased because spark plug wires 56 are retained away from the heat of the exhaust manifold, or headers, of engine 52. Decreased spark plug failure leads to a significant reduction in inconvenience to the owner of engine 52 and leads to a significant reduction in service costs.

Harness 20 is readily installed and removed from engine 52. For example, the rigid nature of body 22 allows a mechanic to push boots 28 onto all of spark plugs 44 concurrently. Moreover, during installation, a possible movement of boots 28 relative to terminals 26 (FIG. 1) will not lead to improper electrical contact of terminals 29 and spark plugs 44 since terminals 29 are coupled to rigid body 22. Thus, the use of harness 20 advantageously results in reliable establishment of electrical contact between terminals 26 and spark plugs 44. In addition, harness 20 can be readily retrofit into vehicles by removing the pre-existing spark plug wires and installing harness 20 and spark plug wires 56.

In an alternative embodiment of the present invention, distributor cap 58, spark plug wires 56, and spark plug wire harness 20 is provided as an assembly 70. Assembly 70 is installed into and removed from engine 52 as a unit. Assembly 70 reduces installation and removal time over prior art systems, again leading to a reduction in service costs. Moreover, if other service is to be performed on engine 52, assembly 70 may be removed as a unit substantially eliminating the possibility of crossing spark plug wires during reinstallation.

In summary, the present invention teaches of a spark plug wire harness for use with an ignition system of an internal combustion engine. The spark plug wire harness includes a substantially rigid body through which conductors are routed. The rigid body insulates the conductors from the heat produced by the internal combustion engine. In addition, the harness removes the necessity of routing spark plug wires near the exhaust manifold. As such, the spark plug wires are less subject to heat fatigue, which reduces engine malfunction, user inconvenience, and repair costs. In addition, the spark plug wire harness, employed within an assembly that includes a distributor cap and spark plug wires, is readily removed and reinstalled with spark plug wire routings intact substantially eliminating the possibility of radio ignition noise and crossfiring of the spark plugs, or shorting of the spark plug leads to ground.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A spark plug wire harness for use with an ignition system of an internal combustion engine comprising:

a substantially rigid body;

plug wire mounting posts coupled to an input end of said substantially rigid body;

terminals coupled to an output end of said substantially rigid body; and conductors embedded in said substantially rigid body, each of said conductors having a first end in electrical communication with one of said plug wire mounting posts and a second end in electrical communication with one of said terminals.

2. A spark plug wire harness as claimed in claim 1 wherein said substantially rigid body insulates said conductors from heat generated by said internal combustion engine.

3. A spark plug wire harness as claimed in claim 2 wherein said substantially rigid body is a heat resistant plastic.

4. A spark plug wire harness as claimed in claim 2 wherein said substantially rigid body is a heat resistant carbon fiber.

5. A spark plug wire harness as claimed in claim 1 wherein said substantially rigid body is adapted to avoid contact with said internal combustion engine.

6. A spark plug wire harness as claimed in claim 1 wherein said substantially rigid body maintains each of said conductors in electrical isolation from one another.

7. A spark plug wire harness as claimed in claim 1 wherein:

said rigid body includes channels, each of said conductors being located in one of said channels; and said harness further comprises epoxy resin located in said channels for retaining said conductors in said channels.

8. A spark plug wire harness as claimed in claim 1 wherein said ignition system includes spark plug wires and each of said plug wire mounting posts is configured to fit in a spark plug boot of one of said spark plug wires in order to establish electrical contact between said each plug wire post and said one of said spark plug wires.

9. A spark plug wire harness as claimed in claim 1 wherein said ignition system includes spark plugs, and said harness further comprises boots, one each of said boots surrounding one each of said terminals, said each boot being configured to be seated over one of said spark plugs in order to establish electrical contact between said each terminal and said one of said spark plugs.

10. A spark plug wire harness as claimed in claim 1 wherein said output end of said substantially rigid body includes a plurality of branches, one each of said terminals being coupled to one each of said branches.

11. A spark plug wire harness as claimed in claim 10 wherein said branches are in spaced-apart relation such that one each of said terminals can be removably placed in electrical communication with one each of a plurality of spark plugs of said ignition system.

12. A spark plug wire harness as claimed in claim 10 wherein:

said input end of said substantially rigid body is formed as a trunk, each of said plug wire mounting posts being coupled to said trunk, said trunk separating to form said branches at said output end; and said conductors are routed from said trunk through corresponding ones of said branches to said terminals.

13. A spark plug wire harness as claimed in claim 1 further comprising:

first unique identifiers on said substantially rigid body proximate said plug wire mounting posts, one each of said first unique identifiers identifying one each of said plug wire mounting posts; and second unique identifiers on said substantially rigid body proximate said terminals, said second unique identifiers corresponding to said first unique identifiers, and one each of said second unique identifiers identifying one each of said terminals.

14. An assembly for providing voltage from a distributor to spark plugs in an ignition system of an internal combustion engine comprising:

a distributor cap configured to couple with said distributor of said ignition system, said distributor cap including conductive posts;

spark plug wires, each of said spark plug wires having a proximal end and a distal end, said proximal end being coupled to one of said conductive posts; and a spark plug wire harness including:

a substantially rigid body;

plug wire mounting posts coupled to an input end of said substantially rigid body, said distal end of said each spark plug wire being coupled to one of said plug wire mounting posts;

terminals coupled to an output end of said substantially rigid body, said terminals being configured to be placed in electrical communication with said spark plugs; and conductors embedded in said substantially rigid body, said conductors having first ends in electrical communication with said plug wire mounting posts and second ends in electrical communication with said terminals.

15. An assembly as claimed in claim 14 wherein said substantially rigid body is a heat resistant plastic for insulating said conductors from heat generated by said internal combustion engine.

16. An assembly as claimed in claim 14 wherein said substantially rigid body is a heat resistant carbon fiber for insulating said conductors from heat generated by said internal combustion engine.

17. An assembly as claimed in claim 14 wherein said substantially rigid body is adapted to avoid contact with said internal combustion engine.

18. An assembly as claimed in claim 14 further comprising:

first unique identifiers on said substantially rigid body proximate said plug wire mounting posts, one each of said first unique identifiers identifying one each of said plug wire mounting posts; and second unique identifiers on said substantially rigid body proximate said terminals, said second unique identifiers corresponding to said first unique identifiers, and one each of said second unique identifiers identifying one each of said terminals.

19. A spark plug wire harness for use with an ignition system of an internal combustion engine comprising:

a substantially rigid body having an input end and an output end, said input end forming a trunk, said trunk separating to form branches at said output end;

plug wire mounting posts coupled to said trunk at said input end of said substantially rigid body;

terminals, one each of said terminals being coupled to one each of said branches at said output end of said substantially rigid body; and conductors embedded in said substantially rigid body and routed from said trunk through corresponding ones of said branches, each of said conductors having a first end in electrical communication with one of said plug wire mounting posts and a second end in electrical communication with one of said terminals, and said substantially rigid body insulating said conductors from heat generated by said internal combustion engine.

20. A spark plug wire harness as claimed in claim 19 wherein said ignition system includes spark plugs, and said harness further comprises boots, one each of said boots surrounding one each of said terminals, said each boot being configured to be seated over one of said spark plugs in order to establish electrical contact between said each terminal and said one of said spark plugs.

* * * * *